United States Patent [19]

McCain

[11] 4,353,572

[45] Oct. 12, 1982

[54] ARTICULATION JOINT ROLL STABILIZER

[75] Inventor: William T. McCain, Huntsville, Ala.

[73] Assignee: The United States of America as represented by the Secretary of the Army, Washington, D.C.

[21] Appl. No.: 155,341

[22] Filed: Jun. 2, 1980

[51] Int. Cl.³ .............................................. B60D 7/00
[52] U.S. Cl. ................................. 280/492; 180/14 R; 180/14 B
[58] Field of Search ............ 280/492; 180/14 B, 14 R

[56] References Cited

U.S. PATENT DOCUMENTS

| | | | |
|---|---|---|---|
| 3,183,991 | 5/1965 | Gamaunt | 180/24 |
| 3,246,720 | 4/1966 | Parrack et al. | 330/271 X |
| 3,384,196 | 5/1968 | Fielding | 180/139 |
| 3,426,720 | 2/1969 | Enos | 280/111 X |
| 3,976,302 | 8/1976 | Hammarstrand | 180/41 |
| 4,079,955 | 3/1978 | Thorpe et al. | 280/492 X |
| 4,236,591 | 12/1980 | Molby | 180/41 |

Primary Examiner—Joseph Paul Brust
Attorney, Agent, or Firm—Peter A. Taucher; John E. McRae; Nathan Edelberg

[57] ABSTRACT

In an articulated vehicle, wherein the trailer has roll motion capability relative to the tractor, the improvement comprising hydraulic cylinder means for selectively locking out the roll mode capability when it is intended to operate the vehicle on smooth terrain.

2 Claims, 5 Drawing Figures

ARTICULATION JOINT ROLL STABILIZER

BACKGROUND AND SUMMARY OF THE INVENTION

U.S. Pat. Nos. 3,183,991 to Gamaunt; 3,426,720 to Enos; and 4,079,995 to Thorpe illustrate articulated vehicles wherein the trailer is capable of motion about the vehicle roll plane to adapt the vehicle for movement over rough terrain, for example along the sides of hills, over rocky areas in which the left wheels are momentarily higher or lower than the right wheels, etc. When the vehicle is traveling over paved roads or smooth terrain, the roll motion may be a deterrent to high speed travel in that the trailer is apt to tip over or sway from side to side, thus making the steering and control of the vehicle difficult or tiring on the driver.

U.S. Pat. No. 4,079,955 illustrates a latch mechanism for locking the trailer out of its roll mode capability when it is intended to operate the vehicle on smooth terrain. The present invention is directed to hydraulic cylinder mechanisms for locking out the roll mode capability. The use of hydraulic cylinders is advantageous in that control valves for the cylinders can be remotely operated, as for example at the vehicle dash board. Also, there is no necessity to align a latch with a keeper as in the arrangement shown in U.S. Pat. No. 4,079,955. The hydraulic cylinders can, with suitable design, be controlled to provide different degrees of resistance to roll motion, from zero resistance to total resistance, i.e. complete lock out.

The invention described herein may be manufactured, used, and licensed by or for the Government for governmental purposes without payment to me of any royalty thereon.

DRAWINGS

FIG. 1 fragmentarily shows a side elevational view of a vehicle embodying my invention with parts thereof broken away for illustration purposes.

Figure 1:
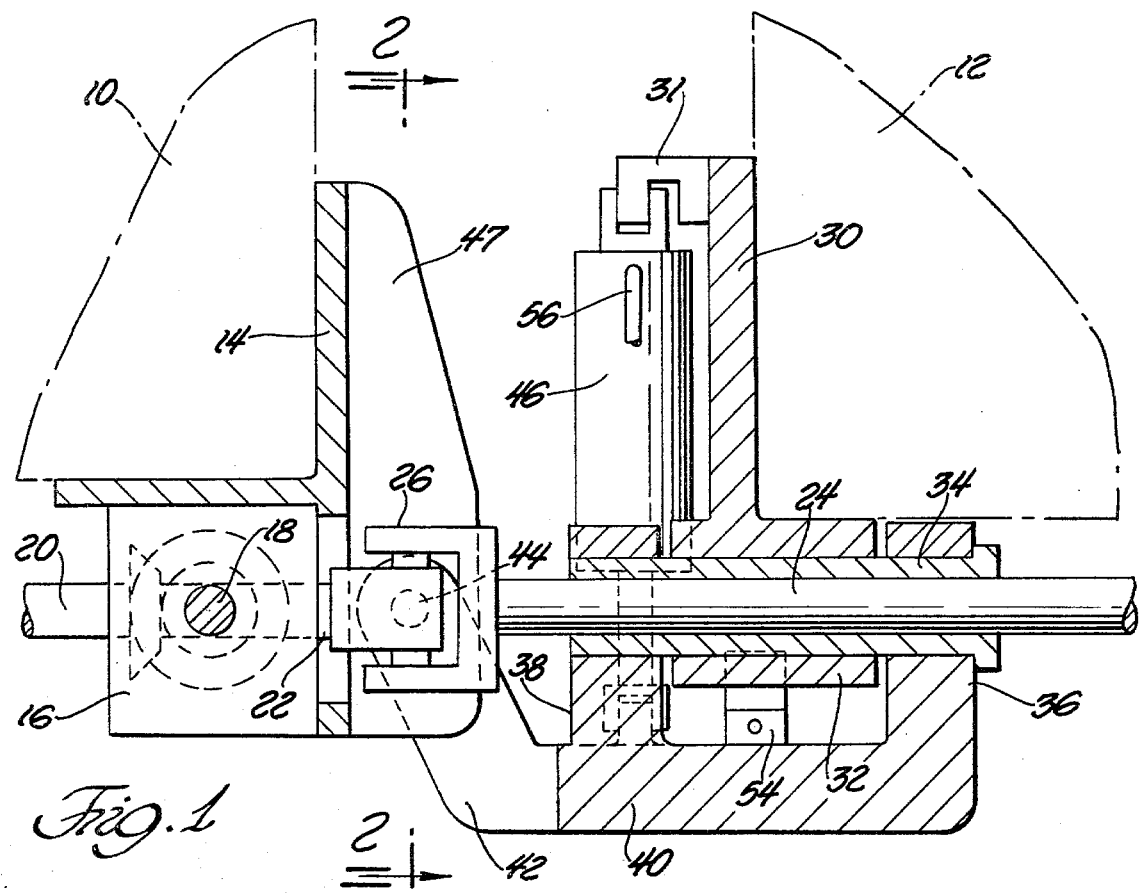
Figure 2:
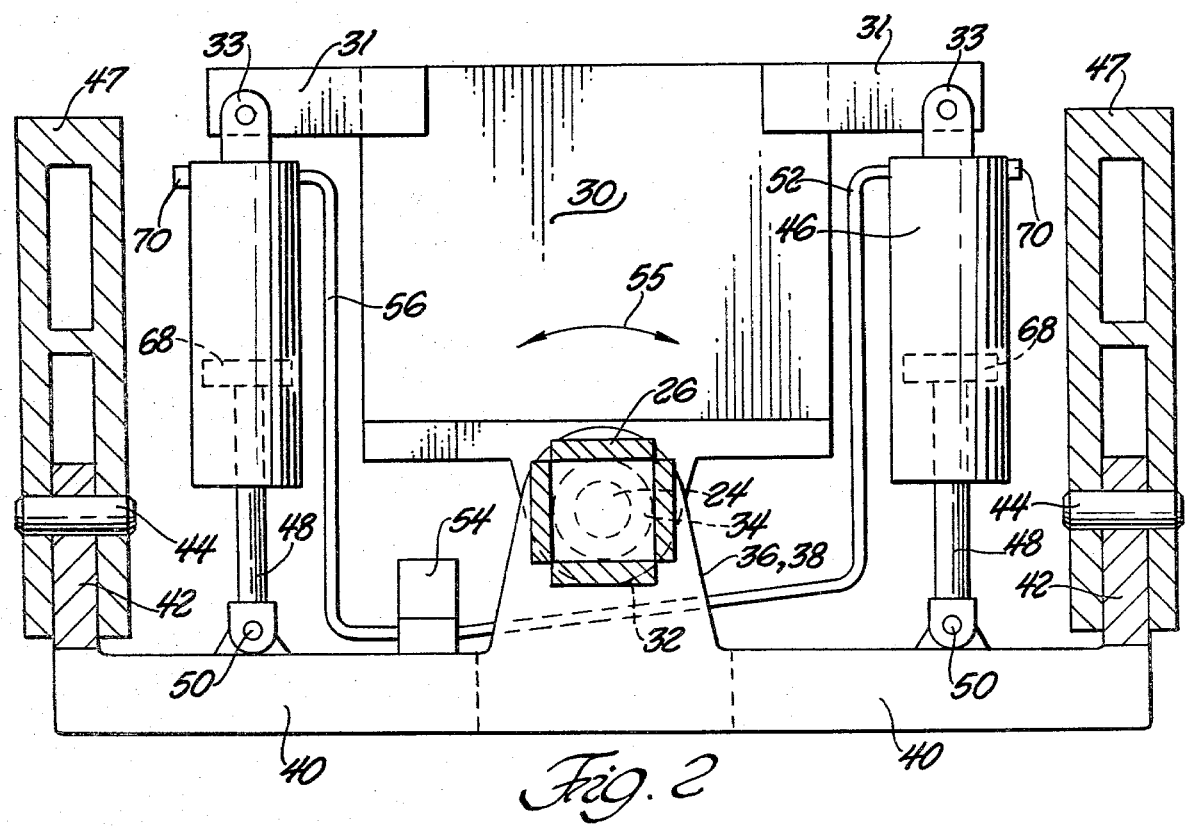
FIG. 2 is a sectional view on line 2—2 in FIG. 1.

Referring in greater detail to FIGS. 1 and 2, there is shown a vehicle comprising a tractor 10 and a trailer 12. The lower rear end of the tractor is provided with a hitch fitting 14 that also mounts a conventional differential 16 for a transverse rear axial 18 connected to the usual tractor wheels, not shown. A front-mounted engine-transmission power plant delivers power to a shaft 20 that powers the transverse axial 18 and shaft extension 22. A conventional universal joint 26 connects shaft extension 22 to a second shaft 24 that delivers power to the trailer wheels, not shown.

The front lower area of trailer 12 is rigidly affixed to a bracket 30 that defines an annular housing 32 concentric with the axis of shaft 24. The shaft is supported in a sleeve bearing 34 that extends through walls 36 and 38 of a hitch fitting 40. Fitting 40 includes two laterally spaced arms 42, best seen in FIG. 2, that extend forwardly to pivotal connections at 44 with the wing sections 47 of tractor fitting 14. Pivot pins 44 are axially aligned with the center of universal joint 26 so that trailer 12 can have swing motion in the vehicle pitch plane without adversely affecting the drive connection 26 or associated shafts 22 and 24. The aforementioned sleeve bearing 34 defines a longitudinal vehicle roll plane axis that enables the trailer 12 to swing around hitch fitting 40 in the vehicle roll plane designated by arrows 55.

Bracket 30 is provided with two arms 31 that form swingable connections 33 for the upper ends of two similar hydraulic cylinders 46 whose piston rods 48 are swingably connected at 50 to the aforementioned hitch fitting 40. The upper ends of hydraulic cylinders 46 are connected in a closed hydraulic circuit that includes a flexible hydraulic line 52, a solenoid valve 54, and a second flexible hydraulic line 56. Assuming that solenoid valve 54 is open the trailer 12 can move in the roll plane designated by arrow 55, with minimum interference by hydraulic cylinders 46; the contracting cylinder will pump liquid through the lines into the expanding cylinder. However, should valve 54 be closed to liquid flow then the contracting cylinder will be unable to pump its liquid out through the lines to the expanding cylinder; the pistons will be locked to their respective cylinders in a no-roll mode of operation.

Figure 4:
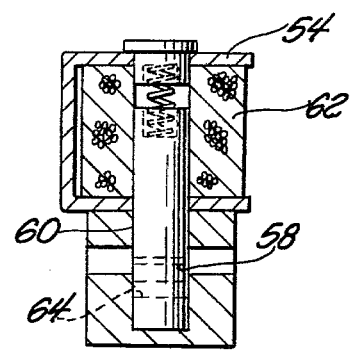

Solenoid valve 54 can be any commercially available valve sized to the flow requirements. The valve can be fully opened in a roll-permitting mode or fully closed in a roll-prevent mode. However, the valve could also flow a slight amount of liquid in its closed position to permit some roll motion without detrimental effect. FIG. 4 illustrates a variable flow solenoid valve in its closed position wherein a relatively small amount of liquid is permitted to flow through port 58 in valve plunger 60. When solenoid winding 62 is electrically energized, plunger 60 is drawn upwardly to permit a larger hydraulic flow through the main port 64. It will be seen that one or more solenoid valves having different flow capacities can be arranged in parallel to provide a range of resistances to motion of the trailer in the roll plane, as necessary or desired to meet different types of terrain. The valve or valves are preferably electrically energized through a manual switch or switches located on the dash board of tractor 10.

Figure 3:
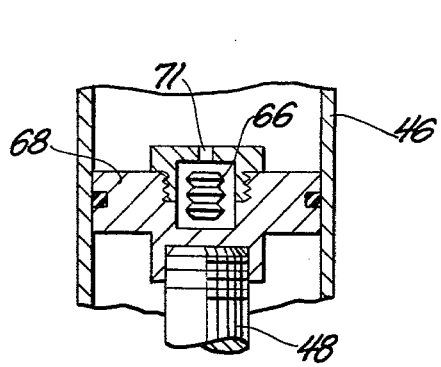
FIGS. 3 and 4 illustrate structural details used in the FIG. 1 vehicle.

FIG. 3 illustrates a mechanism for preventing the over stressing of components due to momentary high pressures within the hydraulic cylinders. The stress-relief action is achieved by means of a hollow sealed bellows 66 positioned within a small cavity in the piston 68. High pressure above the piston is transmitted through a small port 71 to the space surrounding bellows 66, thereby partially contracting the bellows and increasing the total volume above piston 68, thus relieving stress that might otherwise occur. Port 71 is sized as a relatively small orifice so that bellows oscillations will have only minor effect on the total system operating frequency. Air accumulation in the space above each piston 68 may be released to the atmosphere through a conventional vent valve 70 at the upper end of each cylinder 46.

Figure 5:
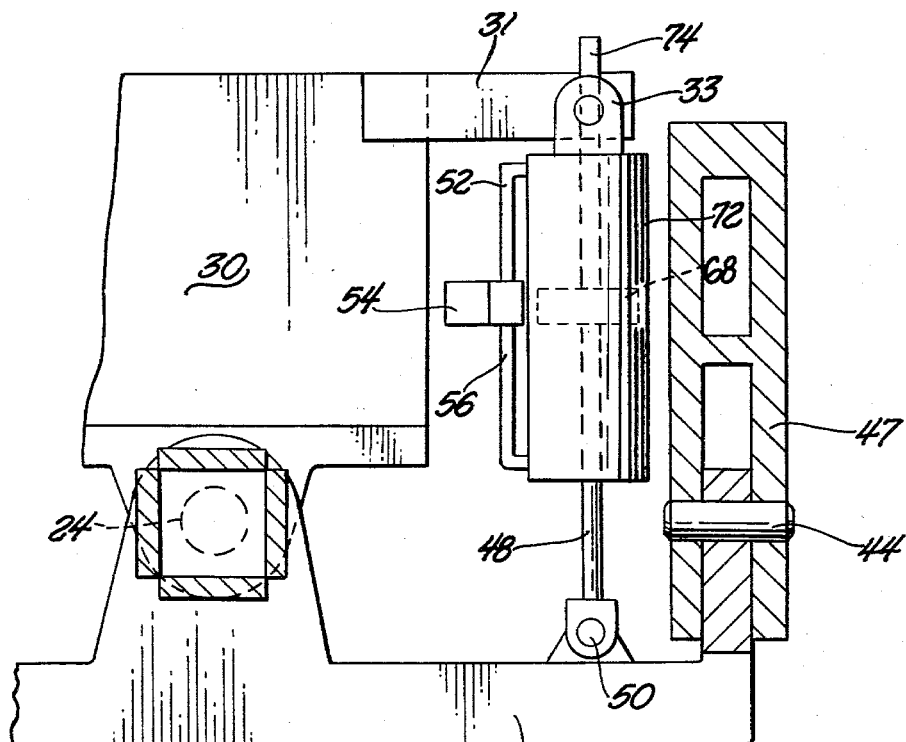
FIG. 5 is a view similar to FIG. 2 illustrating a second embodiment of the invention.

FIG. 5 illustrates a second form of the invention which is similar to the FIG. 2 arrangement except that only one hydraulic cylinder 72 is employed. In this case, piston 68 is provided with a rod extension 74 of the same cross sectional area as piston rod 48. Rod 74 extends from cylinder 72 through a central space purposefully left within the pivotal connection 33. The operation of the FIG. 5 system is similar to the FIG. 2 system since the defined cylinder 72 is the functional equivalent of the two cylinders 46 as far as system operation is concerned.

I wish it to be understood that I do not desire to be limited to the exact details of construction shown and described for obvious modifications will occur to a person skilled in the art.

I claim:

1. An articulated wheeled vehicle comprising a tractor; a trailer; a first hitch fitting (14) carried by the tractor at its rear end; circular bearing means (32) carried by the trailer front end, said bearing means extending along the trailer longitudinal centerline to define a trailer roll plane axis; a second hitch fitting (40) swingable on said bearing means in the trailer roll plane; said second hitch fitting including two laterally spaced arms (42) extending forwardly from the trailer toward the first hitch fitting; hinge pin means (44) connecting the second hitch fitting spaced arms to the first hitch fitting; said hinge pin means extending along a horizontal axis transverse to the tractor longitudinal axis in intersecting relationship to the aforementioned trailer roll plane axis, whereby the hinge pin means defines a tractor-trailer pitch plane axis; hydraulic means for introducing mechanical resistance to motion of the trailer in the roll plane; said hydraulic means comprising a closed hydraulic circuit that includes at least one hydraulic piston-cylinder mechanism trained between the trailer and the second hitch fitting, said piston-cylinder mechanism defining two piston-cylinder chambers of inversely-varying volume; a fluid line (52, 56) interconnecting the two chambers; and a solenoid valve (54) in said fluid line; said valve having a first substantially closed condition offering substantial resistance to liquid flow through the fluid line, and a second open condition offering minimum resistance to liquid flow through the fluid line.

2. The vehicle of claim 1 wherein the piston-cylinder mechanism comprises two essentially identical piston-cylinder units arranged between the trailer and the second hitch fitting at spaced locations outboard from the trailer longitudinal axis; said solenoid valve being physically mounted on the second hitch fitting.

* * * * *